United States Patent
Moff

(10) Patent No.: US 10,918,097 B1
(45) Date of Patent: Feb. 16, 2021

(54) FISHING BOBBER JUNIOR

(71) Applicant: Frank Moff, Latrobe, PA (US)

(72) Inventor: Frank Moff, Latrobe, PA (US)

(*) Notice: Subject to any disclaimer, the term of this patent is extended or adjusted under 35 U.S.C. 154(b) by 361 days.

(21) Appl. No.: 16/100,075

(22) Filed: Aug. 9, 2018

(51) Int. Cl.
*A01K 93/00* (2006.01)
*A01K 93/02* (2006.01)

(52) U.S. Cl.
CPC .................................... *A01K 93/02* (2013.01)

(58) Field of Classification Search
CPC .................................. A01K 93/00; A01K 93/02
See application file for complete search history.

(56) References Cited

U.S. PATENT DOCUMENTS

| | | | | |
|---|---|---|---|---|
| 2,004,414 | A * | 6/1935 | Menefee | A01K 93/00 43/43.1 |
| 5,361,532 | A * | 11/1994 | Moff | A01K 93/00 43/44.9 |
| 8,635,803 | B1 * | 1/2014 | Cartwright | A01K 93/02 43/17 |

* cited by examiner

Primary Examiner — Richard G Davis
(74) Attorney, Agent, or Firm — Lawrence R. Burns

(57) ABSTRACT

A fishing bobber is comprised of a hollow casing, a plug, a weight, a straw and a visibility marker. A weight is captively held moveably inside the hollow casing between one semi-closed end of the casing and a plug telescopically engaged with the other end of the casing. A straw extends through the center of the plug and communicates with the hollow of the casing and then extends to the distal end of the bobber where it is adorned with a visibility marker. A fishing line can be threaded from a fishing pole through the semi-closed end of the casing, through the hollow cavity in the casing, and out through the straw on the distal end of the bobber where a sinker and hook can be located on the fishing line. The hook is located a predetermined distance from the end of the line attached to the sinker. When the fishing bobber assembly is in the horizontal position on the surface of the water the weighted end of the fishing line will freely pull the line from the pole through the fishing bobber assembly until the weight lands on the bed of the fishing spot. A perforation in the middle of the casing allows water to enter the initially air filled hollow of the casing causing the fishing bobber assembly to gradually change from a horizontal position toward a vertical position. The change of position of the bobber rom horizontal to vertical causes the moveable weight to bottom against the semi-closed end of the casing and stops the free movement of the fishing line, which then which then puts tension on the fishing line between the weight on the fishing bed and the vertical positioned bobber.

6 Claims, 3 Drawing Sheets

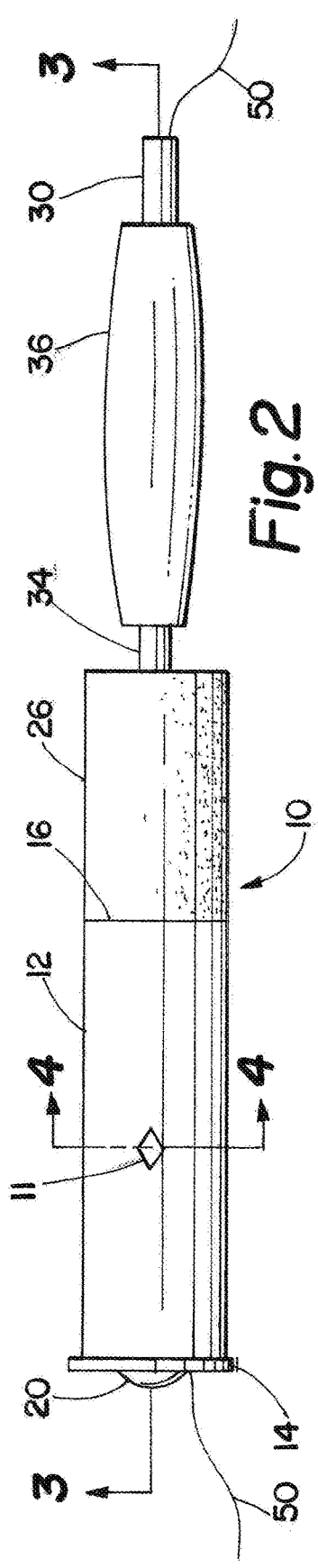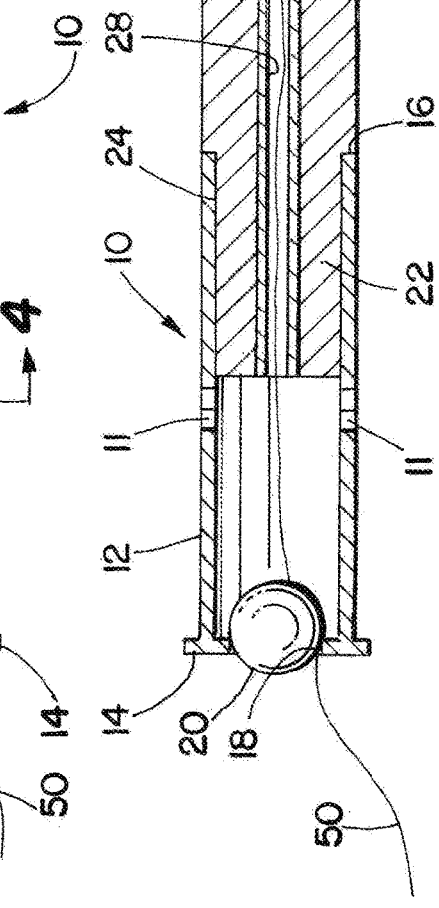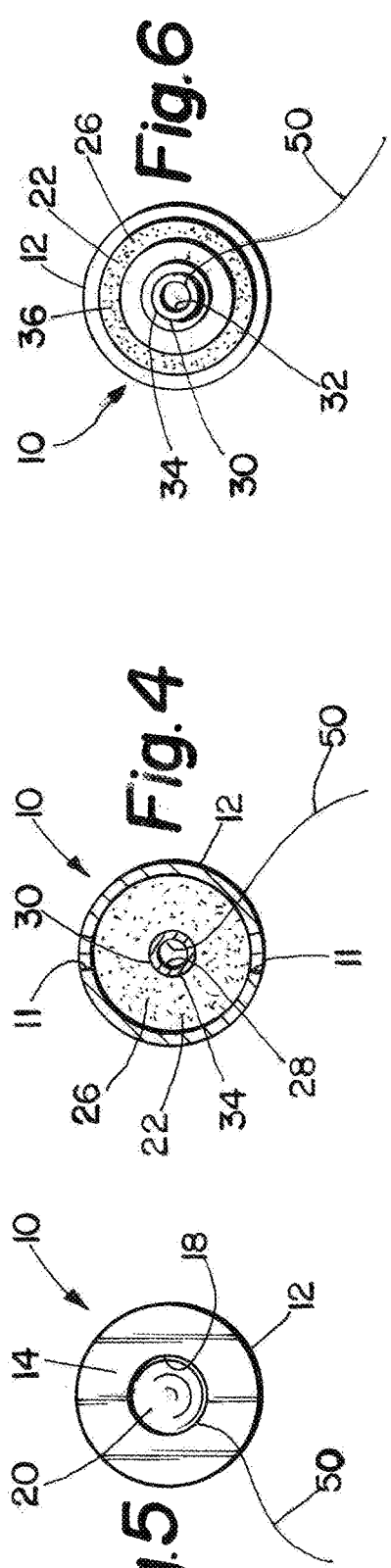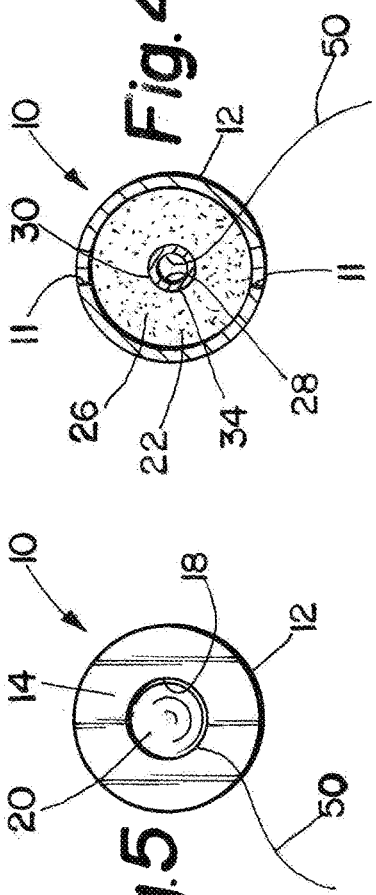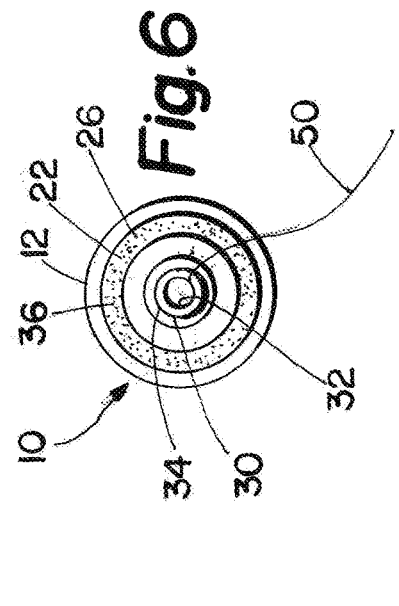

FISHING BOBBER JUNIOR

BACKGROUND OF THE INVENTION

This invention has to do with a fishing bobber that automatically lifts the fishing line off the bed of the fishing location after casting. Previously a similar type bobber was described in U.S. Pat. No. 5,361,532 by the same inventor. In that invention the assembly used a magnetic force to clamp the fishing line securely from movement when assuming a vertical position in the water. The magnet added bulky weight and expense to the bobber and improvements were sought to overcome these difficulties. Through experimentation it was found that the sizing of the weight and the sizing of the hole in the casing abutment end would create an appropriate clamping action necessary to hold the fishing line from moving when the fishing bobber assembly was assuming a vertical position from a horizontal position.

BRIEF SUMMARY OF THE INVENTION

This invention has to do with a fishing bobber which comprises an elongate hollow casing or tube having a reduced opening on one end and a plug telescopically engaged on the other end of the casing or tube. An elongate hollow tube or straw extends through, and is held inside of the plug with the straw communicating with the hollow of the tube. A visibility element is located over the distal end of the straw. There is a weighted material located in the hollow of the casing, freely moveable within, but captively held, in the hollow of the tube between the reduced opening on one end of the tube and the telescopically engaged plug. A passageway extends through the straw and the tube for a fishing line to freely pass and extend from a fishing pole to the hook on the end of the line. The weight in the hollow of the casing allows the fishing line to slide freely through the entire bobber when the straw and tube are substantially horizontal, but prevents freedom of movement by non-magnetic forces when the tube and straw moves from a substantially horizontal position to a substantially vertical position. The weighted material in the cavity, formed between the reduced end of the casing and the telescopically engaged plug located inside of the other end of the casing, is freely moveable but captively held. When in a horizontal position the weighted material allows the fishing line to slide through the passageway and around the weighted material, but when the fishing bobber is in a substantially vertical position the weighted material will, by the force of gravity, clamp the fishing line between the abutment edge of the weighted material and the reduced opening of the elongate tube or casing.

The elongate hollow tube or casing has first and second opposing ends with watertight sidewalls extending between the ends. The opening through the first opposing end of the tube has a dimension smaller than the inside dimension of the sidewalls. An opening in the second opposing end of the tube is substantially the same dimension as the inside dimension of the sidewalls. The plug is comprised of a compressible elastic and water floatable material with a central hole running throughout its length from end to end, with one end having an outer dimension for telescopically compressible engagement with the inside dimension of the second end of the tube.

The weighted material has an overall dimension smaller than the inside diameter of the tube and held captive and freely movable between the first end of the tube and the plug end telescopically engaged with the tube.

A straw member extends through the central opening of the plug and has a central hole communicating on one end with the inside of the tube. On a distal end of the straw member is located a visibility material 36 which also has a central opening 38 running throughout for telescopic engagement with the outer diameter of the straw element so as to be frictionally held in place on the straw element.

OBJECTS OF THE INVENTION

It is an object of the present invention to provide an improved fishing bobber that will help a baited hook efficiently assume a predetermined depth above a fishing bed.

It is an object of the present invention to provide a simpler and more efficient fishing bobber of the kind described in U.S. Pat. No. 5,361,532.

It is an object of the present invention to provide a fishing bobber assembly that automatically changes from a horizontal to a vertical position once it is floating on the surface of the water.

It is an object of the present invention to provide a cheap and economical fishing bobber that helps to determine the placement of the bait above a bed in a fishing environment.

It is a further object of the present invention to provide a simple mechanical, non-magnetic, arrangement for adjusting the depth of a fishing line with bait.

It is a still further object of the present invention to provide a lightweight, simple, and smoothly gravity operating adjustable bait depth fishing bobber.

It is a still further object of the present invention to provide an inexpensive fishing bobber with automatic depth setter features for bait above a fishing bed.

BRIEF DESCRIPTION OF THE DRAWINGS

FIG. 2 is a side view of the fishing bobber according to the present invention.

FIG. 3 is a cross-section of the present invention along line 3-3 of FIG. 2.

FIG. 4 is a cross-section of the present invention along line 4-4 of FIG. 2.

FIG. 5 is a bottom view of the bobber according to the present invention.

FIG. 6 is a top view of the fishing bobber according to the present invention.

DETAILED DESCRIPTION OF THE INVENTION

Figure 1:
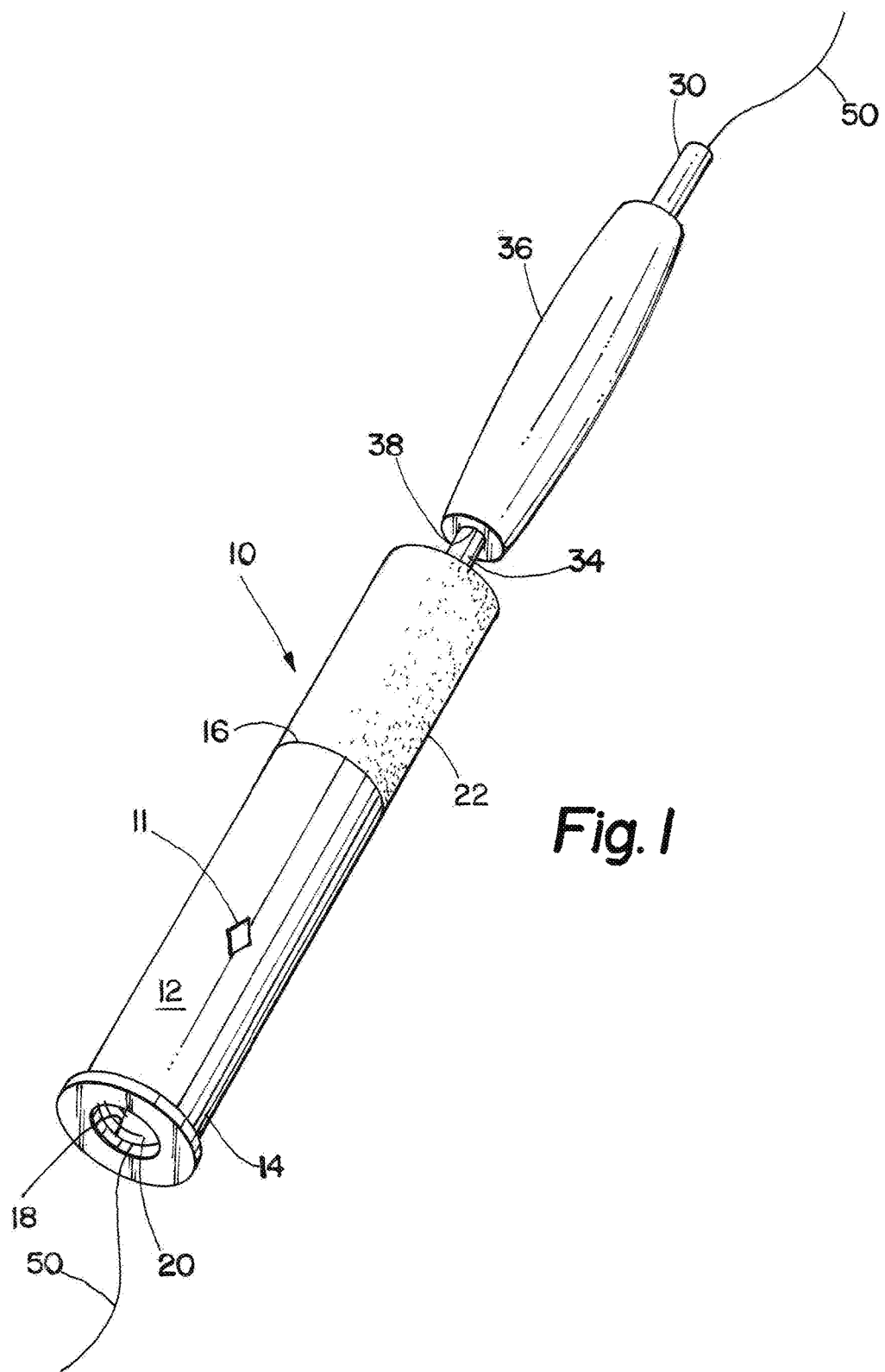
FIG. 1 is a perspective view of the bobber according to the present invention.

What is shown in FIG. 1 is a fishing bobber 10 according to the present invention. The fishing bobber 10 has an elongate tube or casing 12 having first and second opposing ends at 14 and 16. The first opposing end 14 has an opening 18 that is smaller than the inside dimension of the tubing 12, thereby partially closing the end 14 of the tube 12. The end 16 of tubular casing 12 has the opposing opening 18 for telescopically engaging end 24 of plug material 22. The opening 18 in end 14 of casing 12 is smaller than the outer dimensions of a weighted material 20, shown located in the first end of the casing 12 in FIG. 3. An inlet perforation I 1 is shown at a midpoint on the casing 12 its function been to allow water into the cavity of casing 12 when the bobber 10 is in the water. The end 16 of the casing 12 is telescopically engaged with one end of a plug material 22, the plug material 22 being of the deformable plastic, floatable material. A straw 30 is inserted down through a central hole of the plug material 22 so that the straw communicates with the cavity and casing 12. Mounted on the straw 30 is a floatable marking material 36 with a function as visual indicator of the movement of the fishing bobber 10.

The weighted material 20 is freely movable in the tube 12 between the first and 14 and the plug material 22. The plug material 22 is made of a compressible material with one and 24 telescopically engaged with the second end 16 of the tube 12 and the free end 26 that extends outwardly from the tube 12. The whole 28 extends centrally through the plug material from the telescopically engaged 24 through the extending end 26. A straw like tube 30 has a central hole 32 extending throughout its length and has a outer diameter that 34 which is greater than the diameter of the whole 28 that extends through the plug material 22 a floatable material 36 again having a central hole 38 that extends throughout its length is incompressible a fitted over the outside diameter of the straw 30 and the straw 30 is inserted into the compressible plug material so that the straws firmly held in position in the plug material and the floatable material 36 is firmly held on the straw number 38.

Shown in FIG. 2 is the fishing bobber 10 according to the present invention. A fishing line 50, one end attached to a fishing pole (not shown) and the other end to bait or a lure of some sort (not shown), may be threaded from one end 14 of the bobber 10, through the bobber 10 to the other end 30 of the straw 34. And out into the environment for which it is intended. to the through the central hole 32 extending the entire length of the straw 30 and extending even further through the plug material 22 until it exits through the opening 18 in the first end 14 of the tube 12 when the tube is in a horizontal position or at an angle greater than 45° the fishing line 50 may freely slide through the entire fishing bobber assembly, however when gravity pulls the first end 14 of the fishing bobber tend downward the weighted material 20 will then clamped down or seal off the opening 18 and stop any freedom of movement of the fishing line 50 from continuing through the fishing bobber 10 the tube is fitted with an orifice I 1 that allows water to enter the cavity that is formed between the plug material and the first in 14 of the tube 12 wherein the weighted material 20 may freely move along the length thereof when the orifice I 1 allows water in the first and 14 is weighted downward toward the bottom of the fishing area in the weighted material will then stop any freedom of movement of the fishing line 50.

What is shown in FIG. 3 is a cross-section of the present invention taken along line 3-3 of FIG. 2. The casing 12 is shown having first and second opposing ends 14 and 16 with a water inlet perforation I 1 intermediate of the ends 14 and 16. The end 14 has an opening 18 with a dimension smaller than the inside diameter of the hollow casing 12 and also smaller than a weighted material 20 that is located within the hollow of the casing 12. The end 16 has an opening 18 that telescopically engages with end 24 of plug material 22. The plug material 22 is made from a deformable, plastic, floatable, material such that end 22 telescopically engages the opening 18 and end 16 so as to provide a friction fit to hold the plug material in position with the tubular casing 12. The plug material 22 will also form a friction fit around the straw or elongate tube 30 to hold it in place during the casting and operation of the bobber 10. On the outer end of the straw 30 is located the visibility indicator 36 which is made from an elastic floatable material that has a central opening 38 forming a friction fit with the outer dimension of the straw 30 so as to hold it in place during use of the bobber 10.

What is shown in FIG. 4 is a cross-sectional view 4-4 through FIG. 2. FIG. 4 shows the fishing bobber 10 according to the present invention with the tube 12 having inlet perforation shown at I 1. The inlet perforations are necessary to let water into the hollow cavity on the one end of the tube 12 so that when the fishing bobber 10 lands horizontally on the surface of the water weighted material 20 will stay away from the reduced and 18 of the 212 allow the fishing line 52 slide through the tube 12 and the straw 30 until a weighted bottoms out and the line stops moving. At that point the inlet I 1 all allow water to start filling the cavity of 212 Sioux to fishing bobber 10 starts to move from a substantially horizontal position to substantially vertical position. The weighted material 20 will then move towards the reduced opening 18 of tube 12. The outer diameter of 230 is shown having a friction fit with the hole 28 in the plug material 22.

What is shown in FIG. 5 is an end view of the fishing bobber 10 according to the present invention. The interviews shows a fishing bobber 10 having the tube 12 was the first opposing in 14 of the tube 12 the first opposing and 14 is a reduced diameter opening 18 through which a fishing line 50 may pass or enter reduced diameter opening 18 the weighted material 20 shown having a diameter greater than the reduced diameter opening 18.

What is shown in FIG. 6 is an opposite in view of the fishing bobber 10 according to the present invention. FIG. 6 shows a fishing bobber 10 according to the present invention having the outer tube 12 and then the visibility material 36 which surrounds and forms a friction fit with the outer diameter 34 of the tube 30. The fishing line 50 is shown coming out from the central hole 32 of the tube 30.

Figure 7:
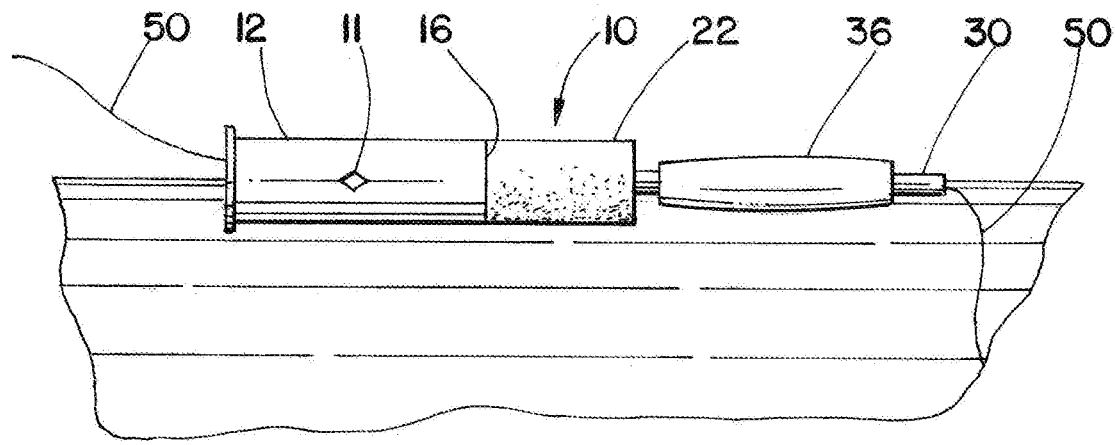
FIG. 7 is an environmental view of the bobber as it first enters the water.

What is shown in FIG. 7 is a fishing bobber 10 in a horizontal position floating on top of the water 52. The fishing bobber 10 shows the fishing line 50 as it enters the first opposing in 14 of the tube 12 and extends through the fishing bobber 10 until it comes out the other end of straw 30 at which point the fishing bobber line 50 then extends downward toward the bed of the water body that your fishing in.

Figure 8:
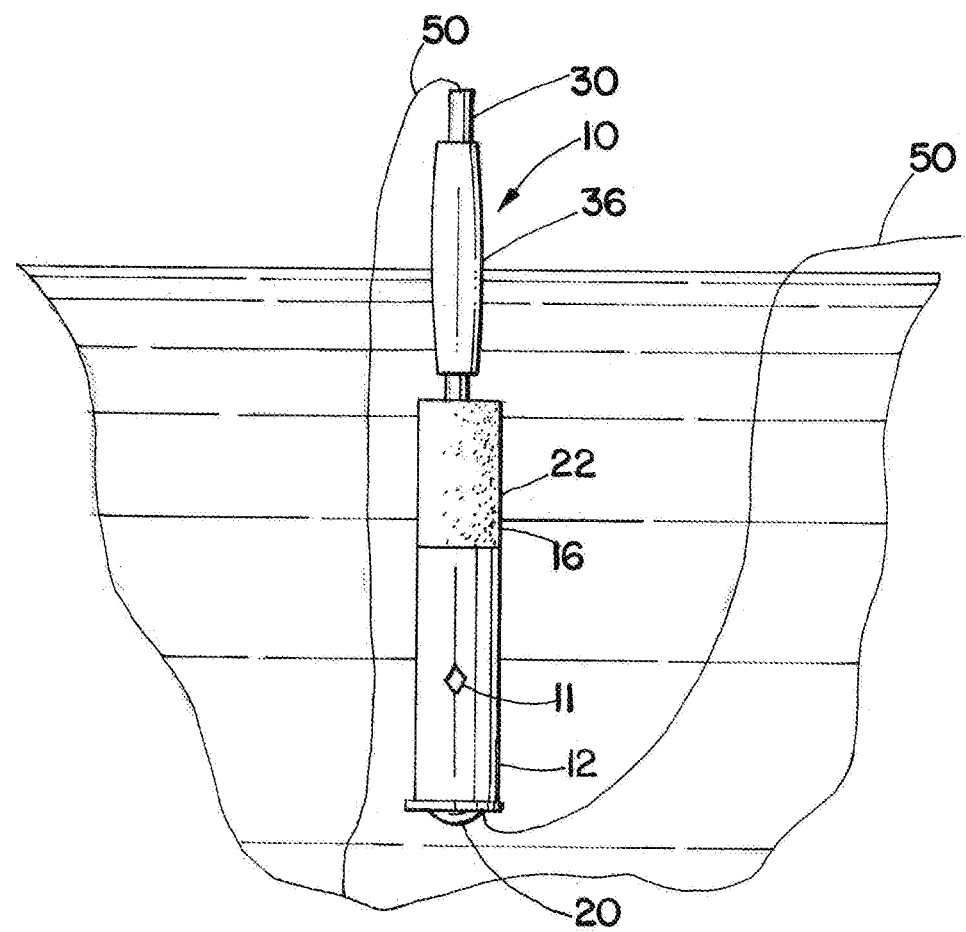
FIG. 8 is another environmental view of the present invention as it automatically uprights itself for final position fishing.

What is shown in FIG. 8 is a fishing bobber 10 in a vertical position showing the fishing line 50 extending out the top of the straw 30 and then extending downwardly toward the bottom bed of the lake or body of water 52 fishing line 50 as it enters the first opposing in 14 of tube 12 is shown in a clamped position would be weighted material 20 clamping the fishing line between the reduced diameter opening 18 and the weighted material 20.

In this invention the weighted material 20 can be formed of a oxidation resistant material that is heavier than water and maybe a steel or ceramic type material. The casing 12 is a hard plastic material.

The invention claimed is:

1. A fishing bobber which comprises:
   a. a hollow tubular casing having opposing first and second ends with a water inlet perforation intermediate said ends;
   b. said first end having an opening smaller than the inside dimension of said hollow tube;
   c. said second end having a co-operative opening for telescopically engaging with one end of a plug element;
   d. a plug with a central opening extending from one end to the other, telescopically engaged with the second end of said tubular casing;

e. a straw extending through the central opening in said plug, and held in position inside said plug, said central opening in said straw communicating with the hollow of said casing;
f. a visibility element over the outside of the distal end of said straw;
g. a weighted material, freely moveable within, but captively held in the hollow of said casing between the first end of said casing and the second plugged end of said casing;
h. communicating fishing line passageways through said casing, straw, plug and tube for a fishing line to pass therethrough;
i. said passageway allowing fishing line to slide freely through it when said straw and tube are substantially horizontal but preventing freedom of movement by non-magnetic forces when said tube and straw are in a substantially non-horizontal position.

2. The fishing bobber according to claim 1 which further comprises:
   h. said hollow tube having first and second opposing ends with watertight sidewalls extending between said ends;
      i. an opening through said first opposing end of said tube having a dimension smaller than the inside dimension of said sidewalls;
      j. an opening in said second opposing end of said tube that is substantially the same dimension as the inside dimension of said sidewalls.

3. The fishing bobber according to claim 2 which further comprises:
   a. said plug comprised of an elastic and water floatable material with a central hole running throughout its length from end to end, and one end for telescopic engagement with said second end of said tube.

4. The fishing bobber according to claim 3 in which said weighted material has a dimension smaller than the inside diameter of the tube and held captive and freely movable between the first end of said tube and said plug end telescopically engaged with the tube.

5. The fishing bobber according to claim 4 in which said straw member extends through the central opening of said plug and has a central hole communicating on one end with the inside of said tube.

6. The fishing bobber according to claim 5 in which said visibility material also has a central opening running throughout for telescopic engagement with the outer diameter of said straw element so as to be frictionally held in place on said straw element.

\* \* \* \* \*